United States Patent

Ohta

[15] 3,690,070
[45] Sept. 12, 1972

[54] WORKPIECE LOCATING APPARATUS FOR USE IN MULTI-WHEEL GRINDING MACHINES

[72] Inventor: Hiroshi Ohta, Kariya, Japan
[73] Assignee: Toyoda Koki Kabushiki Kaisha, Kariya-shi, Aichi-ken, Japan
[22] Filed: Oct. 23, 1970
[21] Appl. No.: 83,505

[52] U.S. Cl. ............... 51/105, 51/165 R, 51/237 CS
[51] Int. Cl. .............................................. B24b 5/42
[58] Field of Search .......... 51/105 SP, 165 R, 237 CS

[56] References Cited

UNITED STATES PATENTS

| | | | |
|---|---|---|---|
| 1,813,503 | 7/1931 | Merryweather | 51/105 SP |
| 2,559,431 | 7/1951 | Hollengreen et al. | 51/105 SP |
| 2,693,060 | 11/1954 | Mader et al. | 51/105 SP |
| 2,693,061 | 11/1954 | Fred | 51/105 SP |
| 2,693,062 | 11/1954 | Silven et al. | 51/105 SP |
| 2,723,504 | 11/1955 | Alvord | 51/105 SP |
| 2,809,472 | 10/1957 | Happel | 51/105 SP |
| 3,098,328 | 7/1963 | Fournier | 51/165 R |

*Primary Examiner*—Harold D. Whitehead
*Attorney*—Wenderoth, Lind & Ponack

[57] ABSTRACT

In a workpiece locating apparatus for working a plurality of spaced apart portions by means of a multi-wheel grinding machine, respectively defined between a pair of surfaces of said workpiece, for example crank-pins of a crankshaft there are provided a plurality of spaced apart locator heads respectively confronting the portions to be worked, mechanisms for moving the locator heads towards and away from the portions to be worked and a mechanism for simultaneously rotating the locator heads. The locator heads are inserted between the surfaces of respective pairs when moved towards the portions to be worked and are urged against one of the surfaces when rotated.

5 Claims, 4 Drawing Figures

WORKPIECE LOCATING APPARATUS FOR USE IN MULTI-WHEEL GRINDING MACHINES

BACKGROUND OF THE INVENTION

This invention relates to a workpiece locating apparatus for a multi-wheel grinding machine and more particularly to a workpiece locating apparatus for a multi-wheel grinding machine for simultaneously grinding two crankpins of a crankshaft for example.

When locating or positioning a workpiece such as a crankshaft on a grinding machine there are generally used two methods. According to one method a surface of the workpiece to be ground is used as the reference surface whereas in the other, a surface not to be ground is used as the reference surface. However, in a grinding machine designed to simultaneously work two crankpins, because it is impossible to work by utilizing the former method it has been the practice to use the latter method. For this reason, unless the accuracy of the previously worked surface or unworked surface is high, the previously worked surface or unworked surface to be ground will not coincide so that some portions of the workpieces will be left unworked or the loads on two grinding wheels will become unbalanced thus lowering the accuracy of the working.

SUMMARY OF THE INVENTION

It is therefore an object of this invention to provide a novel workpiece locating apparatus wherein a plurality of portions of a workpiece are accurately located by utilizing surfaces of the workpiece to be ground.

Another object of this invention is to provide a novel workpiece locating apparatus suitable for use in working a plurality of spaced apart crankpins of crankshafts by means of a multi-wheel grinding wheel wherein respective crankpins to be worked are accurately positioned with respect to respective grinding wheels so as to balance the loads on the grinding wheels thus eliminating an axis load from being applied on the grinding wheels.

Briefly stated, in accordance with this invention there is provided workpiece locating apparatus for working a plurality of spaced apart portions by means of a multi-wheel grinding machine, respectively defined between a pair of surfaces of the workpiece said apparatus comprising a plurality of spaced apart locator heads, each confronting each one of the grinding wheels, and mechanism for moving the locator heads towards and away from the portions to be worked and a mechanism for simultaneously rotating the locator heads. The locator heads are inserted between the surfaces of respective pairs when they are moved towards the portions to be worked and are urged against one of the surface when rotated.

DESCRIPTION OF THE PREFERRED EMBODIMENT

Figure 1:
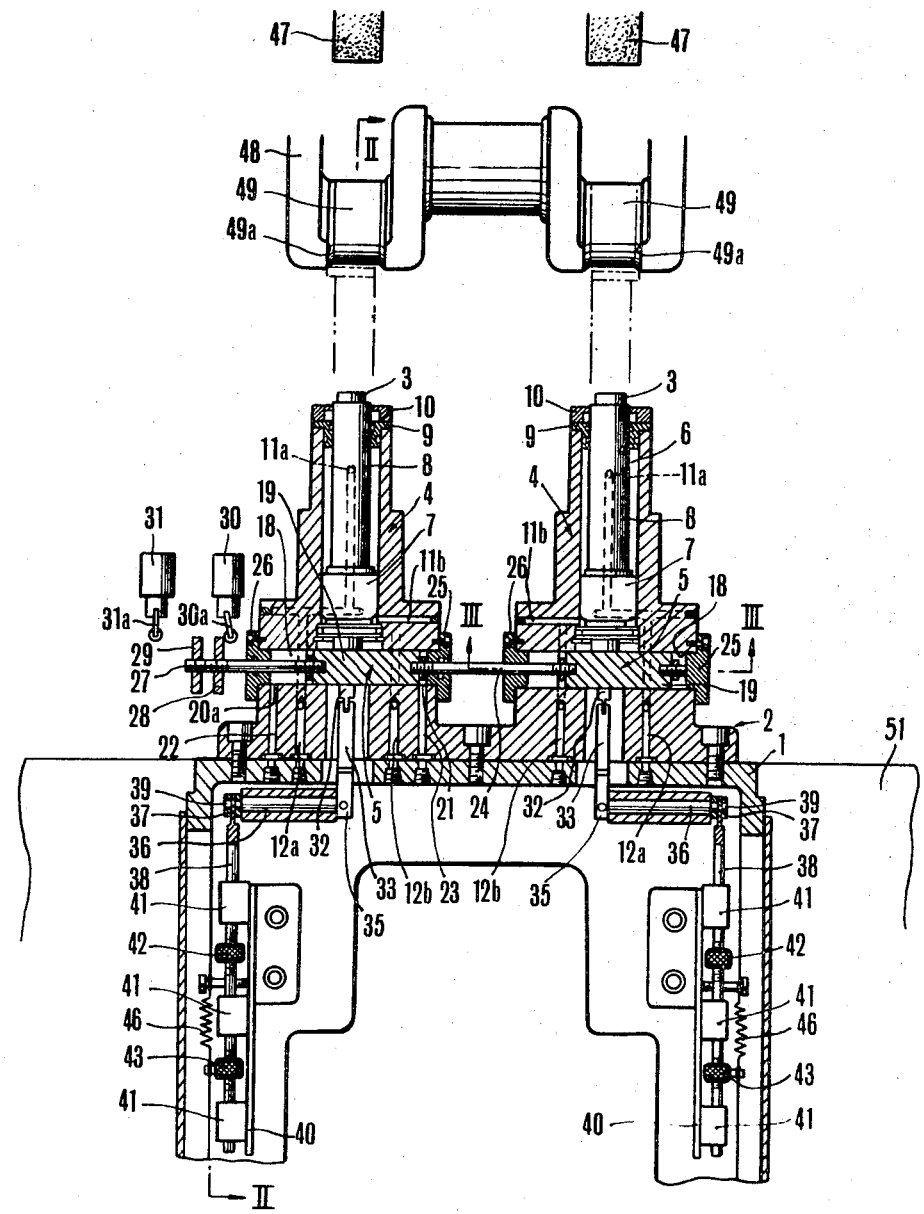
FIG. 1 is a longitudinal sectional view of the workpiece locating apparatus embodying this invention.

The workpiece locator shown in the accompanying drawing comprises a frame 1 secured to a bed 5 and a main body 2 secured to the frame and having a pair of elevating mechanisms 4 and a pair of rotating mechanisms 5 for locator heads 3. Since the constructions of the pairs of elevating mechanisms 4 and rotating mechanisms 5 are the same corresponding parts of the pairs are designated by the same reference numerals.

With reference to the lefthand elevating mechanism 4 it comprises a vertical cylinder 6 formed in the elevating mechanism 4 of the main body 2, a piston 7 slidably received in the cylinder 6 and a piston rod 8 extending through a piston cap 9 and a cap 10 mounted on the upper end of the cylinder. The locator head 3 is mounted on the upper end of piston rod 8. A pair of pressurized oil ports 11a and 11b are formed in the upper and lower portions of the cylinder 6, respectively, said ports 11a and 11b being communicated with a source of pressurized oil (not shown) via a change-over valve (not shown) and oil passages 12a and 12b.

Figure 2:
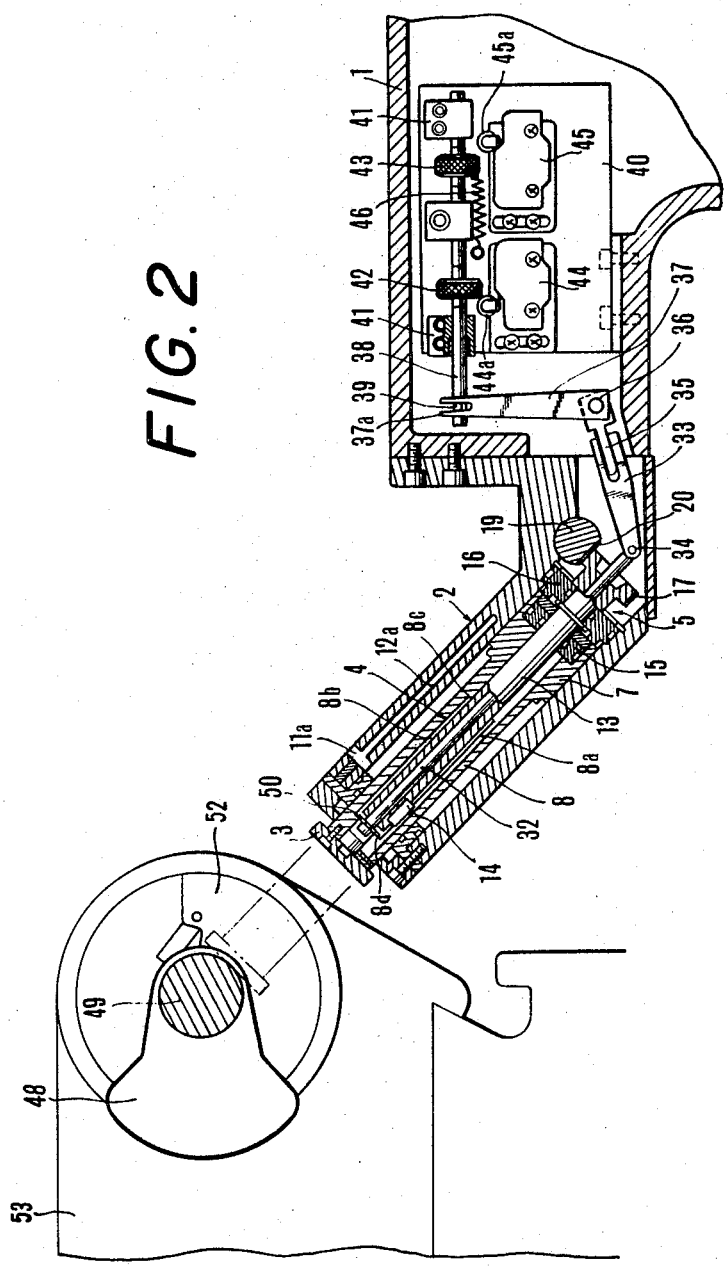
FIG. 2 is a sectional view taken along a line II—II in FIG. 1.

As best shown in FIG. 2, the lefthand rotating mechanism 5 comprises a hollow shaft 13 slidably extending through the centers of piston rod 8 and piston 7 of the elevating mechanism 4.

The shaft 13 has a key slot thereon for receiving a key 14, while a corresponding key way 8a is cut in the piston rod 8. The key 14 is axially slidably engaged in the key way 8a.

Figure 3:
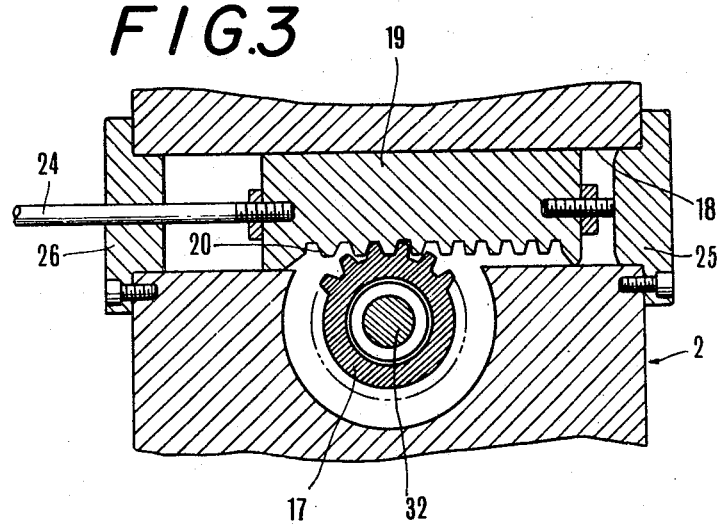
FIG. 3 is a sectional view taken along a line III—III in FIG. 1.

The shaft 13 is coupled to the piston rod 8 through the key 14 for transmitting the torque from shaft 13 to piston rod 8. Shaft 13 slidably and sealingly extends through a lower piston cap 15 and is rotably journalled in a lower cylinder cap 16, and a pinion 17 is secured to the outer end of shaft 13. As shown in FIG. 3, beneath cylinder 6 is provided a transverse cylinder 18 in the main body 2, and a piston 19 is slidably received in cylinder 18 and has a rack 20 on one side meshing with pinion 17 secured to the shaft 13. As shown in FIG. 1 on both sides of piston 19 are formed pressurized oil ports 20a and 21 which are connected with the source of pressurized oil (not shown) via oil passages 22 and 23 and a change-over valve (not shown). A rod 24 is connected to the lefthand end of righthand piston 19, as viewed in FIG. 1, the rod 24 slidably extending through cylinder cap 26 on the left end of the righthand cylinder 18 of the righthand rotating mechanism 5 and being connected with the righthand end of the lefthand piston 19 through cylinder cap 25, thus interconnecting both pistons 19 in the left and righthand rotating mechanisms 5. A rod 27 slidably extending through a lefthand cylinder cap 26 is connected to the lefthand end of lefthand piston 19 of the lefthand rotating mechanism 5, and a pair of dogs 28 and 29 are secured to the outer end of rod 27. On the opposite sides of dogs 28 and 29 are provided a limit-switch 30 for confirming the movement of the locator heads 3 to the original position and a limit-switch 31 for confirming the movement of the locator heads 3 to the rotated position. When dog 28 or 29 engage the operating lever 30a or 31a of the limit-switches 30 and 31, these limit-switches operate to clamp a workpiece 49 which is slidably mounted on eccentric chucks 52 secured to the spindles which are rotatably mounted on headstocks 53 of the grinding machine, or to actuate the elevating mechanism 4 to lower the locator heads 3.

The righthand rotating mechanism 5 is not provided with above described control mechanism including oil passages 22 and 23, control rod 27, and limit-switches 30 and 31.

A shaft 32 of an elevating motion confirming mechanism forming a part of the elevating mechanism 4 is freely received in the hollow shaft 13 of the rotating mechanism 5, as shown in FIG. 2. Upward movement of shaft 32 is limited by a collar 50 secured to the top of the shaft 32 and engaging a shoulder 8d on the upper portion of piston rod 8. An inner bore 8b in the piston rod 8 is slightly larger than the shaft 13, along a predetermined length. The diameter of collar 50 is smaller than the diameter of the bore 8b. Thus, when the piston rod 8 is raised until the shoulder 8c of the bore 8b engages collar 50, shaft 32 will be raised by shoulder 8c through collar 50.

To the extreme lower end of shaft 32 beyond pinion 17 is connected a first lever 33 by a pivot pin 34. The first lever is slidably connected to a second lever 35 which is connected to a third lever 37 through a pivot pin 36 rotatably mounted on the frame 1 (not shown). Bifurcated end 37a of the lever 37 engages a pin 39 secured to one end of a control shaft 38 which is slidably supported by spaced apart supports 41 secured to a base 40 housed in the frame 1 for mounting limit-switches. Shaft 38 also carries a pair of dogs 42 and 43 for operating a limit-switch 44 for confirming the downward movement and a limit-switch 45 for confirming the upward movement through operating levers 44a and 45a of these limit-switches. When the locator head 3 reaches its lowered position or raised position, limit-switch 44 or 45 is operated to confirm completion of the lowering or raising operation of the locator heads 3 and then to advance the grinding wheel carriage or to operate the rotating mechanisms 5. A spring 46 is connected between righthand dog 43 and limit-switch base 40 to normally bias the control shaft 38 toward the left.

Figure 4:
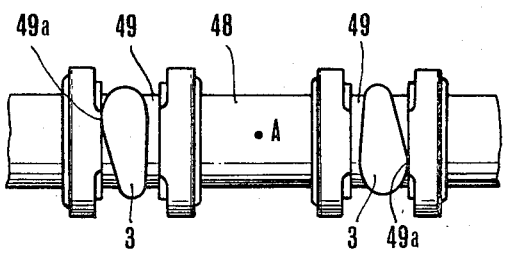
FIG. 4 is a plan view to show the operating positions of the locator heads when positioned between crank arms.

Locator heads 3, as shown in FIG. 4 are in the form of elliptical cams and have the same configuration. And further those heads are point-symmetrically located with respect to a point A of intersection of the axes of the crankpins 49 and the center-line between the locator heads 3.

Just above respective locator heads 3, there are provided a pair of grinding wheels 47. As shown in FIG. 1, crankpins 49 to be ground on the crankshaft 48 are supported between grinding wheels 47 and locator heads 3 by well-known means, not shown.

In operation, when locator heads 3 are in their lowered position as shown by solid lines in FIG. 1, pressurized oil is supplied to the lower side of pistons 7 through passages 12b, and oil port 11b to raise pistons 7 and locator heads 3. At this time, locator heads 3 are positioned so that their longitudinal axes are at an angle of 90° with respect to the axes of crankpins 49 whereby the locator heads 3 are inserted between pairs of shoulders of crankpins 49.

As the locator heads 3 are raised, shoulder 8c at the bottom of bore 8b in the piston rod 8 comes into abutment with collar 50 to raise shaft 32 of the mechanism for confirming up and down motions. Thus, first and second levers 33 and 35 are raised to rotate third lever 37 in the clockwise direction as viewed in FIG. 2 whereby limit-switch 45 for confirming the upward movement is operated by shaft 38 and dog 43. Thus, the upward motion of pistons 7 is stopped when locator heads 3 are brought very close to pins 49 as the upper ends of pistons 7 engage caps 9.

Further, the limit-switch 45 operates to admit pressurized oil to the righthand side of piston 19 in lefthand cylinder 18 through passage 23 and oil port 21 to move piston 19 to the left whereby pinion 17 is rotated by rack 20 to rotate hollow shaft 13. The rotation of this hollow shaft is transmitted to locator head 3 through piston rods 8. When piston 19 in the lefthand cylinder 18 is moved to the left as above described, piston 19 in the righthand cylinder 18 is also moved in the same direction through connecting rod 24 thus causing the righthand locator head 3 to rotate in the same direction concurrently with the lefthand locator head 3. As both locator heads 3 are rotated in this manner, one side corner at the larger diameter end of each engages the inner surface of the outside shoulder 49a, thus setting the axial position of the crankshaft 49 as shown in FIG. 4. The opposite sides of the large diameter ends are chamferred so that they will not engage the inner surface of the inner shoulders.

Concurrently therewith, the lefthand dog 29 on the control rod 27 operates limit-switch 31 to clamp the workpiece 48 by the eccentric chuck mentioned above.

After positioning the pins 49 of the crankshaft 48, or the workpiece and clamping thereof, a change-over valve, not shown, is operated to admit to pressurized oil into the lefthand chamber of cylinder 18 to rotate heads 3 in the opposite direction to disengage them from shoulders 49a. Then limit-switch 30 is operated to operate another change-over valve, not shown, to admit pressurized oil to the upper chambers in cylinders 6 thus lowering locator heads 3. Then, the limit-switch 44 is operated by dog 42 to stop pistons 7 at their lowermost position shown in FIG. 1. Thereafter, grinding wheels 47 are advanced and crankshaft 48 is rotated for grinding.

As above described, according to the locating apparatus of this invention, locator heads 3 are inserted between shoulders on the opposite sides of crankpins 49 and are then rotated whereby the locator heads 3 are caused to engage shoulders adjacent the crankpins to be ground for accurately positioning the crankshaft 48. Moreover, as the grinding wheels 47 are positioned just above the locator heads, in other words, as the distance between the centers of the locator heads 3 and the distance between the axial centers of the grinding wheels 47 are equal the respective centers of the gaps between respective shoulders 49a are made to coincide with the axial centers of respective grinding wheels 47. Consequently, two pins 49 of the workpiece are worked accurately at the same time. Moreover, as the positional errors of the pins with respect to the grinding wheels are eliminated there is no portion remaining unworked. Further, since equal loads are applied on two grinding wheels, no axial load is imposed on the grinding wheel shafts, thus assuring high accuracy workings.

It will be evident that many modifications and variations are possible in light of the above teachings. It, therefore, is to be understood that within the scope of the appended claims the invention may be practiced otherwise than as specifically described.

I claim:

1. A workpiece locating apparatus for a grinding machine having work support means for supporting and rotating a workpiece and a plurality of grinding wheels for effecting simultaneous grinding operations on a plurality of spaced portions of the workpiece, said spaced portions respectively having spaced shoulder portions, said workpiece locating apparatus comprising, in combination, a frame for mounting on a bed of the grinding machine, a pair of spaced locator heads mounted on said frame confronting two of said grinding wheels, said locator heads being movable between retracted positions and operative positions adjacent to the spaced portions of the workpiece and being rotatable on axes respectively perpendicular to the axes of the spaced portions of the workpiece, said locator heads being disposed so that the midpoint between the axes of rotations of the locator heads coincides with the midpoint between said two grinding wheels, means coupled to said locator heads for moving said locator heads between said retracted positions and operative positions, and means coupled to said rotator heads for synchronously rotating said locator heads at operative positions so that each locator head engages the shoulder portion of the workpiece at one side thereof axially to position the workpiece relative to the grinding wheels.

2. A workpiece locating apparatus for a grinding machine having work support means for supporting and rotating a workpiece and a plurality of grinding wheels for effecting simultaneous grinding operations on a plurality of spaced portions of the workpiece, said spaced portions respectively having spaced shoulder portions, said workpiece locating apparatus comprising a pair of spaced locator assemblies for mounting on a bed of the grinding machine to confront two of said grinding wheels, each of said locator assemblies including a main body, a rod disposed in perpendicular relation with the workpiece and slidably rotatably received in said main body, power means coupled to said rod for moving said rod between a retracted position and an operative position adjacent to the workpiece, a locator head secured to the top of the rod, and a shaft rotatably journalled in said main body being coaxially slidably and non-rotatably mounted in said rod, and rotating means operatively connected to the shafts of said locator assemblies for synchronously rotating said shafts, rods and locator heads, said rods of the locator assemblies being disposed so that the midpoint therebetween coincides with the midpoint between said two grinding wheels, whereby each locator head at the operative position, when rotated engages the shoulder portion of the workpiece at one side thereof axially to position the workpiece relative to the grinding wheels.

3. A workpiece locating apparatus as set forth in claim 2, wherein said rotating means comprises a pair of pinions respectively coaxially mounted on said shafts, a rack slidably received in said main body being engaged with said pinions, and means coupled to said rack for moving said rack.

4. A workpiece locating apparatus as set forth in claim 2, wherein said power means comprises a piston integrally coaxially connected to said rod, said main body having a cylinder therein in which said piston is slidably received in coaxial relation with said rod.

5. A workpiece locating apparatus as set forth in claim 2, wherein said locator assembly still further includes a confirming shaft slidably rotatably coaxially received in said shaft, a collar larger than the diameter of the shaft being mounted on the confirming shaft at the one end thereof extending beyond said shaft, said rod having a cylinder therein in which said collar is disposed, said cylinder having a diameter larger than that of the collar and having a shoulder at the end thereof so that the shoulder engages the collar to move the confirming shaft at the end portion of the movement of the rod to the operative position, a pair of dogs operatively connected to said confirming shaft and a pair of detectors respectively confronting said dogs to confirm the movements of the locator head to the retracted and operative positions.

* * * * *